United States Patent [19]

Mizuno et al.

[11] 4,409,299

[45] Oct. 11, 1983

[54] MAGNETIC RECORDING MEDIUM

[75] Inventors: Chiaki Mizuno; Yasuo Tamai; Akira Kasuga, all of Odawara, Japan

[73] Assignee: Fuji Photo Film Co., Ltd., Kanagawa, Japan

[21] Appl. No.: 353,789

[22] Filed: Mar. 2, 1982

[30] Foreign Application Priority Data

Mar. 2, 1981 [JP] Japan ................................ 56-29549

[51] Int. Cl.³ ...................... G11B 5/70; H01F 10/02; B32B 27/30
[52] U.S. Cl. ................................ 428/694; 252/62.54; 360/134; 360/135; 360/136; 427/128; 428/483; 428/522; 428/695; 428/900
[58] Field of Search ............... 428/694, 900, 695, 128, 428/522, 483; 252/62.54; 360/134-136

[56] References Cited

U.S. PATENT DOCUMENTS 4,110,503  8/1978  Ogawa et al. ................... 252/62.54
4,135,016  1/1979  Ogawa ................................ 428/900

FOREIGN PATENT DOCUMENTS 53-11444  4/1978  Japan ................................ 427/128
1132956  of 0000  United Kingdom .

Primary Examiner—Ellis P. Robinson
Attorney, Agent, or Firm—Sughrue, Mion, Zinn, Macpeak & Seas

[57] ABSTRACT

A magnetic recording medium comprising a nonmagnetic flexible base and a magnetic recording layer formed thereon which is mainly composed of fine ferromagnetic particles and a binder. The binder contains both a vinyl chloride/vinyl acetate/vinyl alcohol copolymer and a vinyl chloride/vinylidene chloride copolymer.

17 Claims, No Drawings

MAGNETIC RECORDING MEDIUM

FIELD OF THE INVENTION

The present invention relates to a magnetic recording medium, and more particularly, to a binder composition used in a magnetic recording medium.

BACKGROUND OF THE INVENTION

Audio cassettes and other magnetic recording media have conventionally been used indoors and under other mild temperature and humidity conditions. However, recently marketed cassette decks for car stereo sets and cassette tape recorders with a radio are used outdoors and within vehicles under hostile temperature and humidity conditions. Several problems arise when magnetic recording media are used under such hostile conditions: tape squeal, level drop and unwanted tape running. These magnetic recording media discussed above are described in, for example, U.S. Pat. No. 4,135,016.

SUMMARY OF THE INVENTION

One object of the present invention is to provide a magnetic recording medium that is free from tape squeal during tape running under hostile conditions of high temperature and high humidity.

Another object is to provide a magnetic recording medium having high wear resistance and high abrasion resistance without causing level drop under hostile conditions of high temperature and high humidity.

Still another object is to provide a magnetic recording medium having good running properties without inferior running due to sticking of a magnetic tape on the magnetic head and deforming of a magnetic tape.

As a result of various studies to achieve these objects, the present inventors have found that they can be attained by a magnetic recording medium comprising a non-magnetic flexible support base and a magnetic recording layer (magnetic layer) formed thereon which comprises mainly a binder and fine ferromagnetic particles dispersed therein, said binder comprised of a vinyl chloride/vinyl acetate/vinyl alcohol copolymer and a vinyl chloride/vinylidene chloride copolymer.

DETAILED DESCRIPTION OF THE INVENTION

Conventional binders for magnetic recording media such as cassette tapes include a vinyl chloride/vinyl acetate copolymer, polyurethane resin, nitrocellulose, cellulose propionate, cellulose acetate butyrate, vinyl chloride/vinylidene chloride copolymer, styrene/butadiene copolymer, vinyl chloride/vinyl acetate/vinyl alcohol copolymer, as well as a mixture of vinyl chloride/vinyl acetate/vinyl alcohol copolymer and polyurethane resin and a mixture of vinyl chloride/vinyl acetate copolymer and polyester resin. These binders discussed above are described in, for example, G.B. Pat. No. 1,132,956, Japanese Patent Publication No. 2334/76 and Japanese patent application (OPI) No. 151408/79 (the term "OPI" as used herein refers to a "published unexamined Japanese patent application"). However, none of these binders can achieve the objects of the present invention.

One essential component of the binder used in the present invention is a vinyl chloride/vinyl acetate/vinyl alcohol copolymer. The copolymer preferably consists of 78 to 98 wt%, more preferably 85 to 92 wt%, of vinyl chloride, 0.1 to 15 wt%, more preferably 0.5 to 9 wt%, of vinyl acetate and 1 to 10 wt%, more preferably 1.5 to 6 wt%, and most preferably 2.0 to 4.5 wt%, of vinyl alcohol. The dispersibility of the ferromagnetic particles is decreased as the vinyl alcohol content is reduced. The copolymer may contain another monomer, for example, less than 10 wt%, preferably less than 6 wt%, of maleic acid. The degree of polymerization of the copolymer is preferably from 180 to 1,200, more preferably from 200 to 800, most preferably from 300 to 600. If the degree of polymerization is less than 200, the glass transition point of the copolymer becomes too low, and if the polymerization degree is more than 800, the solubility of the copolymer in an organic solvent is decreased. The other essential component of the binder is a vinyl chloride/vinylidene chloride copolymer which preferably consists of 70 to 95 wt%, more preferably 80 to 90 wt%, of vinyl chloride and 5 to 30 wt%, more preferably 10 to 20 wt%, of vinylidene chloride. The copolymer preferably has a degree of polymerization of 200 to 1,000, more preferably 250 to 800, most preferably 300 to 600.

The vinyl chloride/vinyl acetate/vinyl alcohol copolymer is mixed with the vinyl chloride/vinylidene chloride copolymer preferably in a weight ratio of 25:75 to 75:25, more preferably from 35:65 to 65:35. If the proportion of the vinyl chloride/vinyl acetate/vinyl alcohol copolymer is less than 25, the dispersibility of the ferromagnetic particles is decreased, and if the proportion of the vinyl chloride/vinylidene chloride copolymer is less than 25, the coating made of the binder and the ferromagnetic particles has low flexibility and is brittle. Furthermore, if the proportion of the vinyl chloride/vinyl acetate/vinyl alcohol copolymer is more than 75%, the tape running properties and level drop are deteriorated, and if the proportion of the vinyl chloride/vinylidene chloride copolymer is more than 75%, the tape squeal occurs. The binder according to the present invention may contain less than 30 wt% of other components such as polyurethane resin, cellulose derivative (e.g., nitrocellulose, cellulose propionate, cellulose acetate butyrate), styrene/butadiene copolymer, polyester resin and synthetic rubber. The sum of the vinyl chloride/vinyl acetate/vinyl alcohol copolymer and the vinyl chloride/vinylidene chloride copolymer is preferably from 10 to 100 parts by weight, more preferably from 12 to 30 parts by weight, for 100 parts by weight of the ferromagnetic particles. The present invention is characterized by using the binder described above, and for particulars of the ferromagnetic particles, additives (e.g., abrasive, lubricant), other coating layers (e.g., back coating), base (thickness: 3–37µ), and the method of preparing a magnetic recording medium, reference can be had to Japanese patent application (OPI) No. 108804/77 and U.S. Pat. No. 4,135,016.

The magnetic recording medium of the present invention has the following advantages:

(1) A tape free from tape squeal during running under high temperature and high moisture conditions can be produced from the medium;

(2) It has high wear resistance and can be run under high temperature and high moisture conditions without recording or reproduction output level drop on account of the scraping of the magnetic layer and the buildup of dislodged magnetic particles on the magnetic head;

(3) A tape having a suitable Young's modulus and which has good running properties under high temperature and high moisture conditions can be produced by changing the mixing ratio of the vinyl chloride/vinyl acetate/vinyl alcohol copolymer and the vinyl chloride/vinylidene chloride copolymer;

(4) The medium has high abrasion resistance under high temperature and high moisture conditions (the magnetic layer is abrasion-proof).

The present invention is now described in greater detail by reference to the following Examples and Comparative Example which are given here for illustrative purposes only and are by no means intended to limit its scope. In the Examples and Comparative Example, all parts are by weight.

EXAMPLE 1

Six samples each made of the ingredients indicated in Table 1 were agitated thoroughly with a ball mill and a sand grinder. The resulting dispersions were filtered through a filter having an average pore size of 3 μm to provide magnetic paint formulations. Each paint formulation was spread on a polyethylene terephthalate base (7 μm thick) with a reverse roll coater to give a dry film thickness of 5 μm. While the coating was still wet, the base was passed under a magnetic field for orientation, dried, and super-calendered to provide the magnetic layer with a mirror surface. The resulting product was slit into an audio cassette tape 3.81 mm wide. Five other cassette tape samples were produced in the same manner, and the properties of the six samples produced are set forth in Table 2.

The evaluations of running property, tape squeal and level drop were carried out by the following methods.

Running Properties

The running properties of the resulting audio cassette tapes under condition of temperature of 25° C. and humidity of about 50% RH and condition of temperature of 40° C. and humidity of 80% RH were respectively evaluated using twenty marketed audio cassette decks as follows: "Very good" means that non-uniform take-up of a tape and running stop do not occur at all under each condition, "Good" means that running stop does not occur under each condition, but non-uniform take-up of a tape occurs in one, two or three audio cassette decks under each condition, and "Medium" means that non-uniform take-up of a tape occurs in four-six audio cassette decks under each condition, and in one or two audio cassette decks thereof the running stop occurs.

Tape Squeal

The tape squeal in the running test under condition of temperature of 60° C. and humidity of 90% RH was evaluated using ten marketed cassette decks for car stereo sets as follows: "None" means that tape squeal does not occur at all, "Faint" means that tape squeal temporarily occurs in one or two cassette decks, and "Present" means that tape squeal temporarily occurs in three-five cassette decks.

Level Drop

The average value of maximum drop level continued for 30 minutes or more at initial output level of 3 KHz in running test under condition of temperature of 60° C. and humidity of 90% RH was measured using ten marketed cassette decks for car stereo sets.

TABLE 1

| Formulation | Sample No. | | | | | |
|---|---|---|---|---|---|---|
| | No. 1 | No. 2 | No. 3 | No. 4 | No. 5 | No. 6 |
| $\gamma$-$Fe_2O_3$ | 300 | 300 | 300 | 300 | 300 | 300 |
| Vinyl chloride/vinyl acetate/vinyl alcohol copolymer (90:3:7) | 75 | 56.2 | 45 | 30 | 18.8 | — |
| Vinyl chloride/vinylidene chloride copolymer (87:13) | — | 18.8 | 30 | 45 | 56.2 | 75 |
| Oleic acid | 3 | | | | | |
| Dimethyl polysiloxane (degree of polymerization: 60) | 0.3 | | | | | |
| $\alpha$-Olefin oxide (carbon numbers: 18) | 3 | Same as Col. 1 | Same as Col. 1 | Same as Col. 1 | Same as Col. 1 | Same as Col. 1 |
| Electrically conducting carbon black | 6 | | | | | |
| n-Butyl acetate | 700 | | | | | |

TABLE 2

| | Sample No. | | | | | |
|---|---|---|---|---|---|---|
| | No. 1 | No. 2 | No. 3 | No. 4 | No. 5 | No. 6 |
| Squareness ratio (Br/Bm) | 0.86 | 0.86 | 0.85 | 0.85 | 0.84 | 0.82 |
| Surface gloss | 130 | 145 | 145 | 140 | 125 | 110 |
| Output (dB) | −0.2 | −0.4 | −0.3 | −0.4 | −0.6 | −0.9 |
| Frequency characteristics (dB) | +1.5 | +2.0 | +1.8 | +1.9 | +2.1 | +1.1 |
| Young's modulus of the magnetic layer (kg/mm$^2$) | 1,620 | 1,300 | 1,020 | 830 | 650 | 380 |
| Running properties | Medium | Good | Very good | Very good | Good | Medium |
| Tape squeal | None | None | None | None | Faint | Present |
| Level drop (dB) | 14.5 | 7.3 | 3.5 | 3.7 | 5.0 | 8.4 |

EXAMPLE 2

Six audio cassette tape samples were prepared as in Example 1 except that a binder containing a vinyl chloride/vinyl acetate/vinyl alcohol copolymer and a vinyl chloride/vinylidene chloride copolymer in a ratio of 4:6 was used in the amounts indicated in Table 3. The properties of the tape samples obtained are set forth in Table 3 as in Example 1.

TABLE 3

| | Sample No. | | | | | |
|---|---|---|---|---|---|---|
| | No. 7 | No. 8 | No. 9 | No. 10 | No. 11 | No. 12 |
| $\gamma$-Fe$_2$O$_3$ (parts by weight) | 300 | 300 | 300 | 300 | 300 | 300 |
| Binder (parts by weight) | 30 | 45 | 60 | 75 | 90 | 105 |
| Squareness ratio (Br/Bm) | 0.85 | 0.86 | 0.85 | 0.85 | 0.84 | 0.83 |
| Surface gloss | 150 | 156 | 145 | 140 | 128 | 115 |
| Output (dB) | +0.5 | +0.5 | −0.2 | −0.4 | −0.7 | −1.3 |
| Frequency characteristics (dB) | +1.9 | +2.3 | +2.1 | +1.9 | +1.4 | +1.0 |
| Young's modulus of magnetic layer (kg/mm$^2$) | 320 | 470 | 650 | 830 | 910 | 950 |
| Running properties | Good | Very good | Very good | Very good | Very good | Very good |
| Tape squeal | None | None | None | None | None | None |
| Level drop | 7.6 | 4.9 | 4.2 | 3.7 | 3.5 | 3.7 |

COMPARATIVE EXAMPLE

Six comparative magnetic tape samples were prepared as in Example 1 except that conventional binders were used (i.e., a mixture of vinyl chloride/vinyl acetate/vinyl alcohol copolymer and polyurethane resin as described in G.B. Pat. No. 1,132,956 and Japanese patent application (OPI) No. 151408/79, and a mixture of vinyl chloride/vinylidene chloride copolymer and polyurethane resin as described in Japanese patent publication No. 2334/76). The results are shown in Table 4 as in Example 1.

TABLE 4

| | Sample No. | | | | | |
|---|---|---|---|---|---|---|
| | No. 13 | No. 14 | No. 15 | No. 16 | No. 17 | No. 18 |
| $\gamma$-Fe$_2$O$_3$ (parts by weight) | 300 | 300 | 300 | 300 | 300 | 300 |
| Vinyl chloride/vinyl acetate/vinyl alcohol copolymer (parts by weight) | 60 | 52.5 | 45 | — | — | — |
| Vinyl chloride/vinylidene chloride copolymer (parts by weight) | — | — | — | 60 | 52.5 | 45 |
| Polyurethane resin (parts by weight) | 15 | 22.5 | 30 | 15 | 22.5 | 30 |
| a. Squareness ratio (Br/Bm) | 0.87 | 0.88 | 0.88 | 0.83 | 0.82 | 0.82 |
| b. Surface gloss | 155 | 163 | 160 | 110 | 117 | 115 |
| c. Output (dB) | +0.3 | +0.3 | +0.1 | −0.9 | −1.1 | −1.3 |
| d. Frequency characteristics (dB) | +2.5 | +2.8 | +2.7 | +1.0 | +0.6 | +0.6 |
| e. Young's modulus of magnetic layer (kg/mm$^2$) | 940 | 680 | 430 | 470 | 410 | 320 |
| f. Running properties | Very good | Good | Medium | Good | Medium | Medium |
| g. Tape squeal | Present | Present | Present | Present | Present | Present |
| h. Level drop (dB) | 3.9 | 4.5 | 4.7 | 5.5 | 5.3 | 5.5 |

The data shows that Sample Nos. 13 to 18 prepared by using the conventional binders had more tape squeal and greater level drop than Sample No. 4 of the present invention when they were run under high temperature and high humidity conditions. It is, therefore, clear that the tape squeal and level drop that accompany conventional magnetic tapes using a thermoplastic resin binder can be eliminated by using a binder containing both a vinyl chloride/vinyl acetate/vinyl alcohol copolymer and a vinyl chloride/vinylidene chloride copolymer according to the present invention. Further, it can be seen that the vinyl chloride/vinyl acetate/vinyl alcohol copolymer and the vinyl chloride/vinylidene chloride copolymer are preferably mixed in a weight ratio of between 25:75 to 75:25.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic flexible support base;
   a magnetic recording layer formed on a surface of said support base, the layer comprised mainly of fine ferromagnetic particles and a binder, the binder comprised of:
   a vinyl chloride/vinyl acetate/vinyl alcohol copolymer; and
   a vinyl chloride/vinylidene chloride copolymer.

2. A magnetic recording medium as claimed in claim 1, wherein said vinyl chloride/vinyl acetate/vinyl alcohol copolymer consists of 78 to 98 weight percent vinyl chloride, 0.1 to 15 weight percent vinyl acetate and 1 to 10 weight percent vinyl alcohol.

3. A magnetic recording medium as claimed in claim 2, wherein said vinyl chloride/vinyl acetate/vinyl alcohol copolymer consists of 85 to 92 weight percent vinyl chloride, 0.5 to 9 weight percent vinyl acetate, and 1.5 to 6 weight percent vinyl alcohol.

4. A magnetic recording medium as claimed in claim 3, wherein said vinyl chloride/vinyl acetate/vinyl alcohol copolymer consists of 85 to 92 weight percent vinyl chloride, 0.5 to 9 weight percent vinyl acetate, and 2.0 to 4.5 weight percent vinyl alcohol.

5. A magnetic recording medium as claimed in claim 1, wherein said vinyl chloride/vinyl acetate/vinyl alcohol copolymer is further comprised of a maleic acid monomer in an amount of less than 10 weight percent.

6. A magnetic recording medium as claimed in claim 1, wherein said vinyl chloride/vinyl acetate/vinyl alcohol copolymer has a degree of polymerization of from 180 to 1,200.

7. A magnetic recording medium as claimed in claim 6, wherein said degree of polymerization is from 200 to 800.

8. A magnetic recording medium as claimed in claim 7, wherein said degree of polymerization is 300 to 600.

9. A magnetic recording medium as claimed in claim 1, wherein said vinyl chloride/vinylidene chloride copolymer consists of 70 to 95 weight percent vinyl chloride and 5 to 30 weight percent vinylidene chloride.

10. A magnetic recording medium as claimed in claim 9, wherein said vinyl chloride/vinylidene chloride copolymer consists of 80 to 90 weight percent vinyl chloride and 10 to 20 weight percent vinylidene chloride.

11. A magnetic recording medium as claimed in claim 10, wherein said vinyl chloride/vinylidene chloride copolymer has a degree of polymerization of 200 to 1,000.

12. A magnetic recording medium as claimed in claim 11, wherein said degree of polymerization is 250 to 800.

13. A magnetic recording medium as claimed in claim 12, wherein said degree of polymerization is 300 to 600.

14. A magnetic recording medium as claimed in claim 1, wherein the vinyl chloride/vinyl acetate/vinyl alcohol copolymer is mixed with the vinyl chloride/vinylidene chloride copolymer in a weight ratio of between 25:75 to 75:25.

15. A magnetic recording medium as claimed in claim 14, wherein said weight ratio is from about 35:65 to about 65:35.

16. A magnetic recording medium as claimed in claim 1, wherein the sum of said vinyl chloride/vinyl acetate/vinyl alcohol copolymer and said vinyl chloride/vinylidene chloride copolymer is from 10 to 100 parts by weight per 100 parts by weight of the ferromagnetic particles.

17. A magnetic recording medium as claimed in claim 16, wherein said sum of the copolymers is from 12 to 30 parts by weight per 100 parts by weight of ferromagnetic particles.

* * * * *